(12) United States Patent
Abe et al.

(10) Patent No.: US 7,377,541 B2
(45) Date of Patent: May 27, 2008

(54) LEG-PROTECTION DEVICE FOR VEHICLE OCCUPANT

(75) Inventors: Kazuhiro Abe, Berlin (DE); Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 483 days.

(21) Appl. No.: 11/032,086

(22) Filed: Jan. 11, 2005

(65) Prior Publication Data

US 2005/0151352 A1 Jul. 14, 2005

(30) Foreign Application Priority Data

| Jan. 14, 2004 | (JP) | ............................ 2004-007013 |
| Jan. 14, 2004 | (JP) | ............................ 2004-007014 |
| Feb. 17, 2004 | (JP) | ............................ 2004-040110 |
| Mar. 4, 2004 | (JP) | ............................ 2004-060880 |

(51) Int. Cl.
B60R 21/22 (2006.01)

(52) U.S. Cl. ................................. 280/730.1

(58) Field of Classification Search ............ 280/730.1, 280/743.1, 752
See application file for complete search history.

(56) References Cited

U.S. PATENT DOCUMENTS 6,196,577 B1 * 3/2001 Aoki et al. .............. 280/730.1
6,390,500 B1 * 5/2002 Yamada et al. .......... 280/743.1
6,715,789 B2 4/2004 Takimoto et al.
6,916,039 B2 * 7/2005 Abe ........................... 280/729
7,201,395 B2 * 4/2007 Nagata et al. ........... 280/730.1
2003/0120409 A1 6/2003 Takimoto et al.
2004/0262896 A1 12/2004 Mizuno et al.
2006/0071459 A1 4/2006 Hayakawa et al.

FOREIGN PATENT DOCUMENTS

| DE | 199 46 477 | 3/2001 |
| EP | 0 861 762 | 9/1998 |
| EP | 1 262 378 | 12/2002 |
| EP | 1 300 299 | 4/2003 |
| JP | 2003-118528 | 4/2003 |
| JP | 2003-205816 | 7/2003 |
| JP | 2004-345530 | 12/2004 |

* cited by examiner

*Primary Examiner*—Paul N. Dickson
*Assistant Examiner*—Robert A. Coker
(74) *Attorney, Agent, or Firm*—Manabu Kanesaka

(57) ABSTRACT

A leg-protection device is disposed under a steering column for protecting a vehicle occupant. The leg-protection device includes an airbag to be inflated upwardly along a bottom surface of a steering-column cover and a projecting member provided at the airbag and projecting from a front end portion of the airbag in a inflating direction when the airbag is inflated.

15 Claims, 17 Drawing Sheets

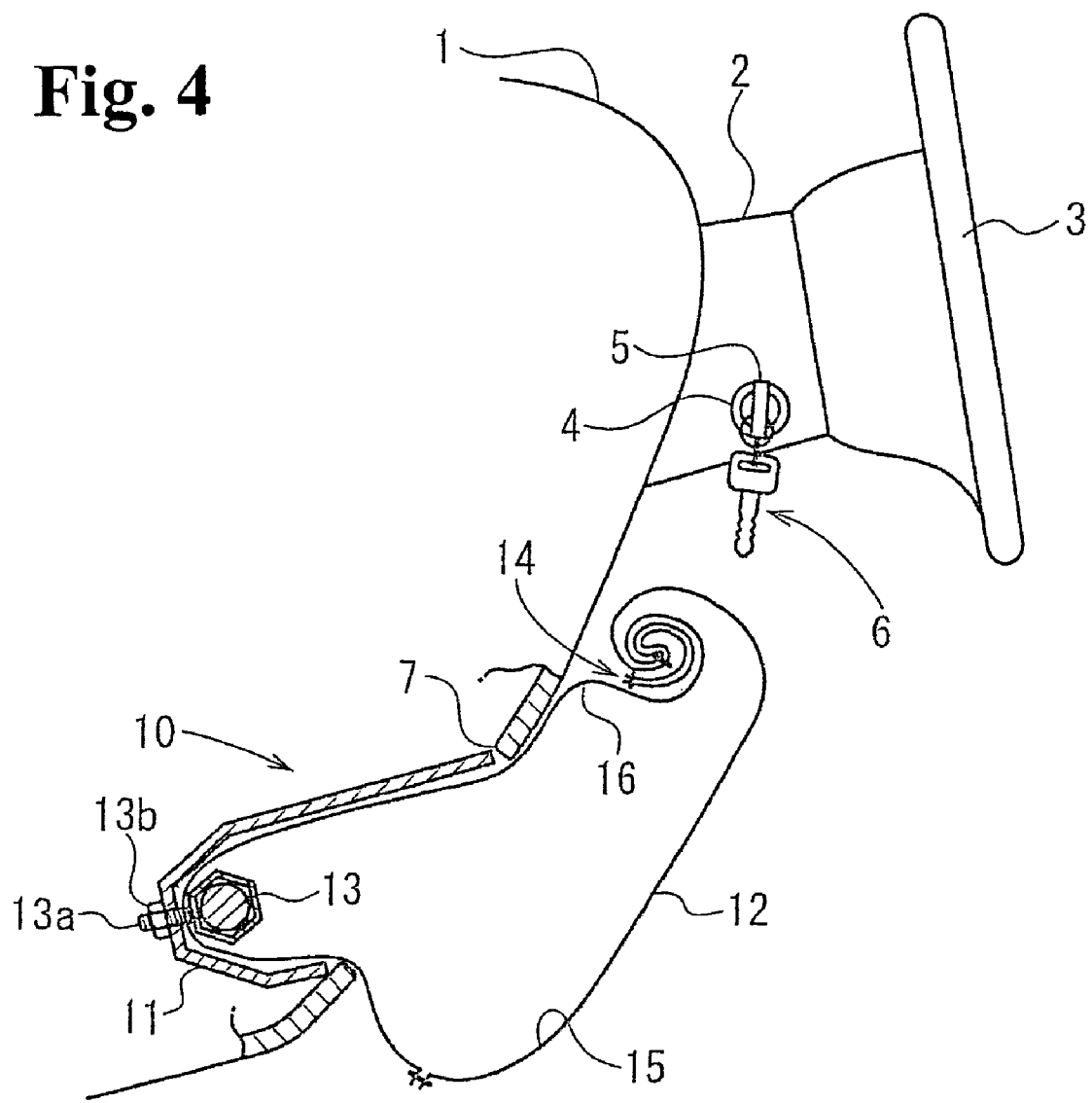

LEG-PROTECTION DEVICE FOR VEHICLE OCCUPANT

BACKGROUND OF THE INVENTION AND RELATED ART STATEMENT

The present invention relates to a leg-protection device for protecting legs of a vehicle occupant in case of a vehicle collision. More specifically, the present invention relates to a leg-protection device for an occupant in a driver seat.

In order to protect legs of a vehicle occupant in case of a vehicle collision, a conventional leg-protection device includes a case disposed behind an instrument panel in front of a seat; an airbag contained in the case; and a gas generator for inflating the airbag. When the vehicle collides, the gas generator is activated to discharge gas to the airbag, and the airbag is inflated into a space between the instrument panel and the occupant for protecting the leg.

Japanese Patent Publication (Kokai) No. 2003-226215 has disclosed such a leg-protection device disposed below a steering column. In the leg-protection device disclosed in Japanese Patent Publication (Kokai) No. 2003-226215, an airbag is inflated along a bottom surface of a steering-column cover when the vehicle collides, and the inflated airbag protects a leg of a driver.

As shown in FIG. 1 of the leg-protection device disclosed in Japanese Patent Publication (Kokai) No. 2003-226215, a keyhole is provided in a side surface of the steering-column cover. When a key with a key chain or the like (e.g., an accessory or another key) is inserted in the keyhole, the key chain or the like may hang down to a space below the steering-column cover. In such a case, the key chain or the like may interfere the airbag when the airbag is inflated in the space below the steering-column cover.

In view of the problems described above, an object of the present invention is to provide a leg-protection device for a vehicle occupant. The leg-protection device includes an airbag to be inflated in a space below a steering column (steering-column cover) such that a key chain or the like does not interfere the airbag.

Further objects and advantages of the invention will be apparent from the following description of the invention.

SUMMARY OF THE INVENTION

In order to attain the objects described above, according to a first aspect of the present invention, a leg-protection device for a vehicle occupant is disposed under a steering column, and includes an airbag to be inflated upwardly along a bottom surface of a steering-column cover and a projecting member provided integrally with the airbag and projecting from a front end of the airbag in an inflating direction when the airbag is inflated.

According to a second aspect of the present invention, in the leg-protection device of the first aspect of the present invention, the projecting member is formed in a tab shape.

According to a third aspect of the present invention, in the leg-protection device of the second aspect of the present invention, the projecting member is folded on a side facing the occupant or on an opposite side.

According to a fourth aspect of the present invention, in the leg-protection device of the third aspect of the present invention, the projecting member is folded in an accordion shape, a roll shape, or a combination of the accordion shape and the roll shape.

According to a fifth aspect of the present invention, the leg-protection device of the third or fourth aspect of the present invention further includes a cover cloth for covering the projecting member in a folded state.

According to a sixth aspect of the present invention, in the leg-protection device of the second aspect of the present invention, an upper portion of the airbag is folded inwardly such that the upper portion is tucked in, and the tab-shaped projecting member is folded together with the upper portion of the airbag.

In the present invention, the leg-protection device for the vehicle occupant includes the projecting member projecting from the front end of the airbag in the inflating direction when the airbag is inflated. Therefore, even if a key chain or the like hangs down below the steering-column cover when the airbag is inflated along the bottom surface of the steering-column cover, the projecting member contacts and pushes the key chain or the like before the airbag contacts the key chain or the like. Accordingly, the key chain or the like hanging down below the steering-column cover does not interfere the airbag when the airbag is inflated along the bottom surface of the steering-column cover.

In the present invention, the projecting member is formed integrally with the airbag (integrally with a panel of cloth or the like forming the airbag), so that the projecting member is easily provided. The projecting member may be a small, tab-shaped member capable of pushing the key chain or the like away. Further, the projecting member is folded on the side facing the occupant or on the opposite side. In such a case, the size of the folded airbag can be reduced.

In the present invention, the projecting member may be folded in an accordion shape, a roll shape, or a combination of the accordion shape and the roll shape. In such a case, the airbag is preferably rolled from top to bottom such that a side of the airbag opposite to the occupant faces the center of the roll. When the airbag is rolled in this manner, the rolled airbag deploys upwardly while rotating toward the occupant viewed from above. Because of this rotation, when the airbag is unrolled to the top, the top edge of the airbag moves upwardly along a curve in a direction toward the occupant. At this time, the front-end portion of the projecting member is pushed upwardly by the top edge of the airbag and projects beyond the top edge of the airbag. When the airbag is rolled from top to bottom such that the side of the airbag opposite to the occupant faces the center of the roll, the airbag is unrolled and rotates on a front portion of the occupant leg when it is inflated. Therefore, the airbag smoothly deploys without being caught by the front portion of the occupant leg.

When the tab-shaped projecting member is bent over to the side facing the occupant or to the opposite side, the cover cloth may be provided for covering the projecting member in a folded state. In such a case, the projecting member is prevented from being unfolded and the airbag device is easily assembled. Accordingly, the folded shape of the projecting member is reliably maintained in the airbag device. When the airbag is inflated, the projecting member is covered with the cover cloth until the airbag becomes the fully deployed state, and bounces upwardly to push away the key holder or the like at the final phase of the inflation.

In the present invention, the upper portion of the airbag is folded inwardly such that the upper portion is tucked in, and the tab-shaped projecting member may be folded together with the upper portion of the airbag. In such a case, a pleat formed by folding the upper portion of the airbag inward is pushed up toward outside the airbag when the airbag is inflated, thereby pushing the projecting member to bounce upwardly and push the key chain or the like.

According to a seventh aspect of the present invention, a leg-protection device for a vehicle occupant is disposed under a steering column. The leg-protection device includes an airbag to be inflated upwardly along a bottom surface of a steering-column cover, and a projecting member provided on the airbag and projecting from a front end of the airbag in an inflating direction when the airbag is inflated. The projecting member is formed independently of the airbag.

According to an eighth aspect of the present invention, in the leg-protection device of the seventh aspect, the projecting member is formed in a tab shape, and has a base end attached to the airbag on a side facing the occupant and a front end disposed on a side opposite to the occupant such that the projecting member extends over an upper portion of the airbag.

According to a ninth aspect of the present invention, the leg-protection device of the eighth aspect further includes a cover cloth provided on the airbag on the side opposite to the occupant for covering the projecting member in a folded state.

According to a tenth aspect of the present invention, in the leg-protection device of the seventh aspect, the projecting member is formed in a tab shape, and has a base end attached to the airbag on the side opposite to the occupant and a front end disposed on the side facing the occupant such that the projecting member extends over an upper portion of the airbag.

According to an eleventh aspect of the present invention, the leg-protection device of the tenth aspect further includes a cover cloth provided on the airbag on the side facing the occupant for covering the projecting member in a folded state.

According to a twelfth aspect of the present invention, in the leg-protection device of one of the eighth to eleventh aspects, the upper portion of the airbag is folded inwardly such that the upper portion is tucked in, and the projecting member extends over the inwardly-folded upper portion and is folded in an accordion shape, a roll shape, or a combination of the accordion shape and the roll shape.

In the present invention, the projecting member is formed independently of the airbag (independently of panels of cloths or the like forming the airbag), so that the projecting member can be attached at any desired position. The projecting member is formed in a tab shape, and has the base end attached to the airbag on the side facing the occupant (preferably at a position near the top edge) and the front end disposed on the side opposite to the occupant such that the projecting member extends over an upper portion of the airbag. In such a case, the airbag is preferably rolled from top to bottom such that the side of the airbag opposite to the occupant faces the center of the roll. Accordingly, the rolled airbag deploys upwardly while rotating toward the occupant viewed from above. Because of the rotation, when the airbag is unrolled to the top, the top edge of the airbag moves upwardly along a curve in a direction toward the occupant. At this time, a front-end portion of the projecting member is pushed upward by the top edge of the airbag and projects beyond the top edge of the airbag.

When the airbag is rolled from top to bottom such that the side of the airbag opposite to the occupant faces the center of the roll, the airbag is unrolled and rotates on the front portions of the occupant legs upon inflation. Therefore, the airbag smoothly deploys without being caught by the front portions of the occupant legs.

When the tab-shaped projecting member is bent over from the side facing the occupant to the opposite side, the cover cloth may be provided on the side opposite to the occupant for covering the projecting member in a folded state. In such a case, the projecting member is prevented from being unfolded and the airbag device is easily assembled. In addition, the folded shape of the airbag is reliably maintained in the airbag device. When the airbag is inflated, the projecting member is covered with the cover cloth until the shape of the airbag becomes close to that in the fully deployed state, and bounces upwardly to push away the key holder or the like at the final phase of the inflation.

In the present invention, the projecting member is formed in a tab shape, and has the base end attached to the airbag on the side opposite to the occupant and the front end disposed on the side facing the occupant such that the projecting member extends over an upper portion of the airbag. In this case, the cover cloth may be provided on the side facing the occupant for covering the projecting member in a folded state to maintain the folded shape of the projecting member.

In the present invention, the upper portion of the airbag may be folded inwardly such that the upper portion is tucked in. In such a case, a pleat formed by folding the upper portion of the airbag inwardly is pushed up toward outside the airbag when the airbag is inflated, thereby pushing the projecting member to bounce upwardly beyond the top edge of the airbag. The projecting member extending over the upper portion may be folded in an accordion shape, a roll shape, or a combination of the accordion shape and the roll shape.

BRIEF DESCRIPTION OF THE DRAWINGS

FIG. 4 is a vertical sectional view showing a process of inflating the airbag of the leg-protection device shown in FIGS. 1(a) and 1(b);

DETAILED DESCRIPTION OF PREFERRED EMBODIMENTS

Figure 1A:
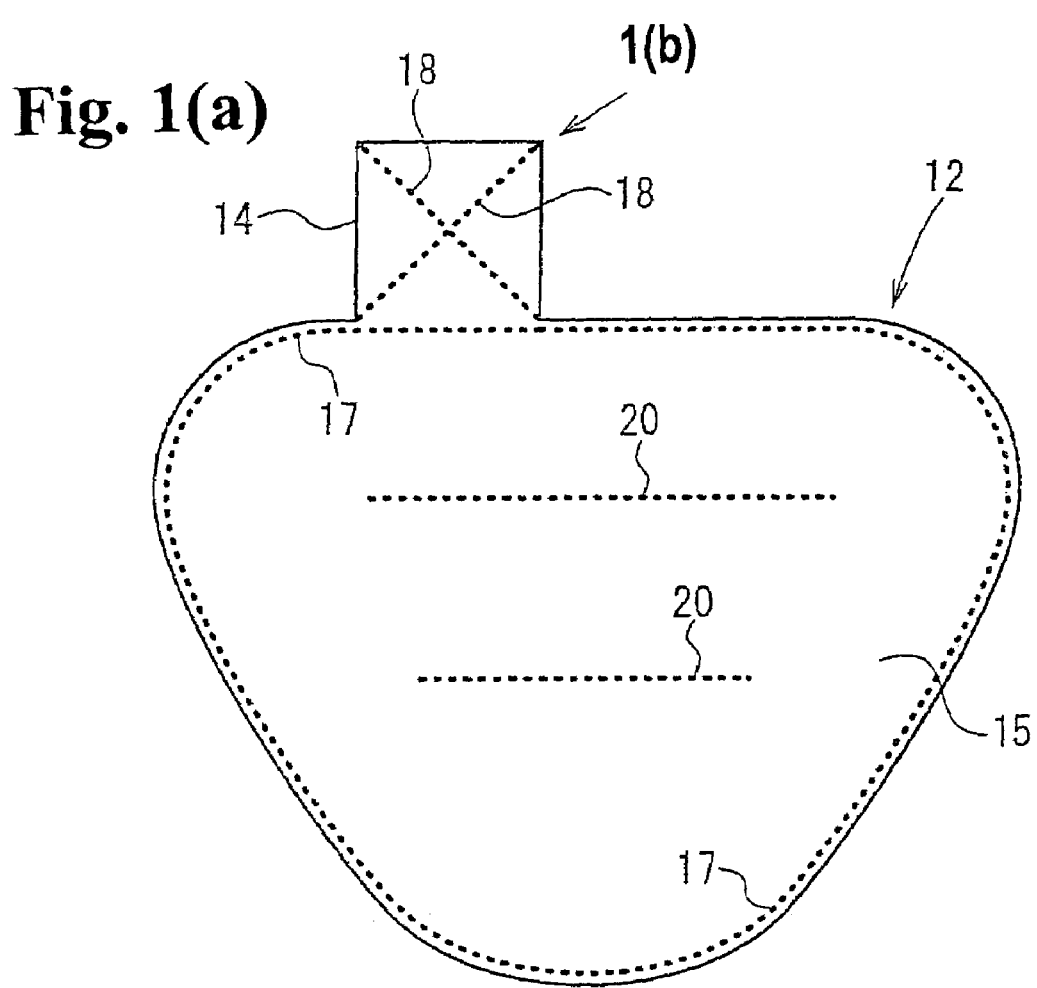
FIGS. 1(a) and 1(b) are views showing a structure of an airbag of a leg-protection device for a vehicle occupant according to an embodiment of the present invention.
Figure 1B:
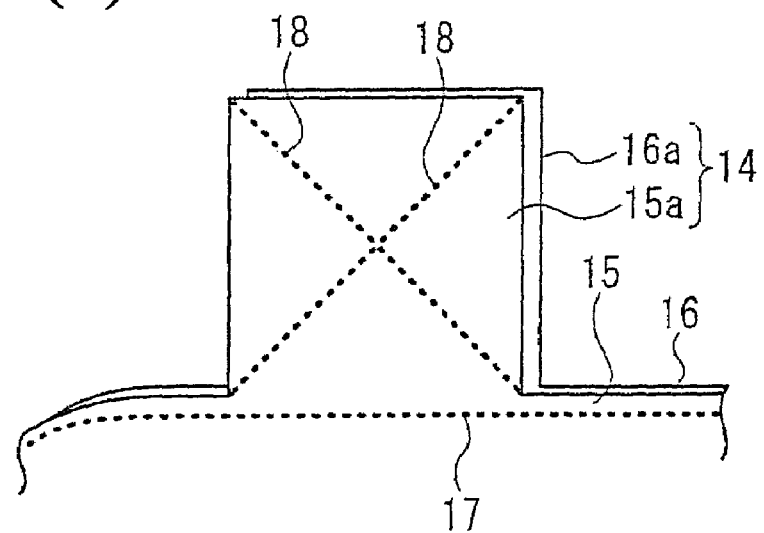
Figure 2:
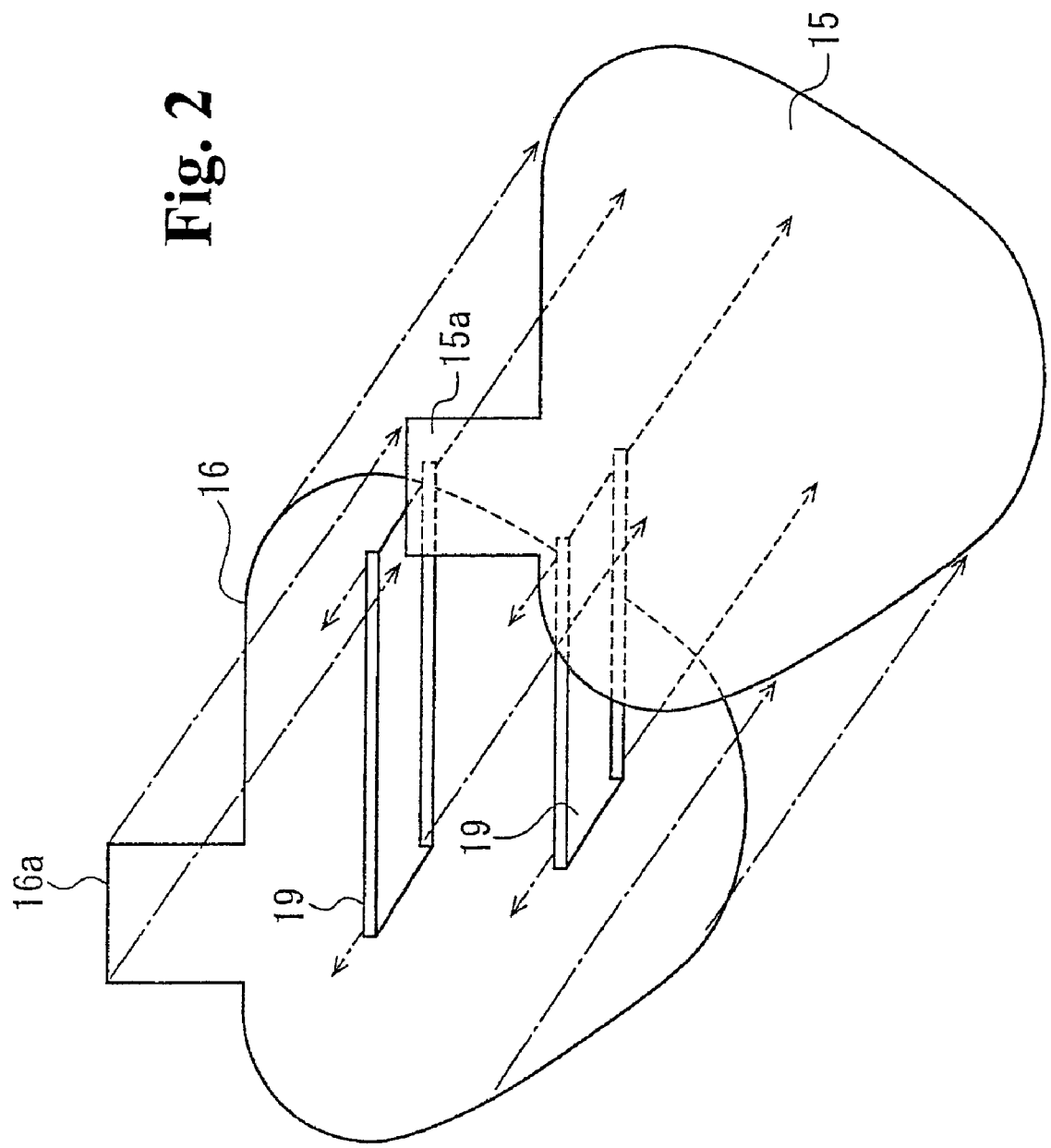
FIG. 2 is en exploded perspective view of the airbag shown in FIGS. 1(a) and 1(b)
Figure 3A:
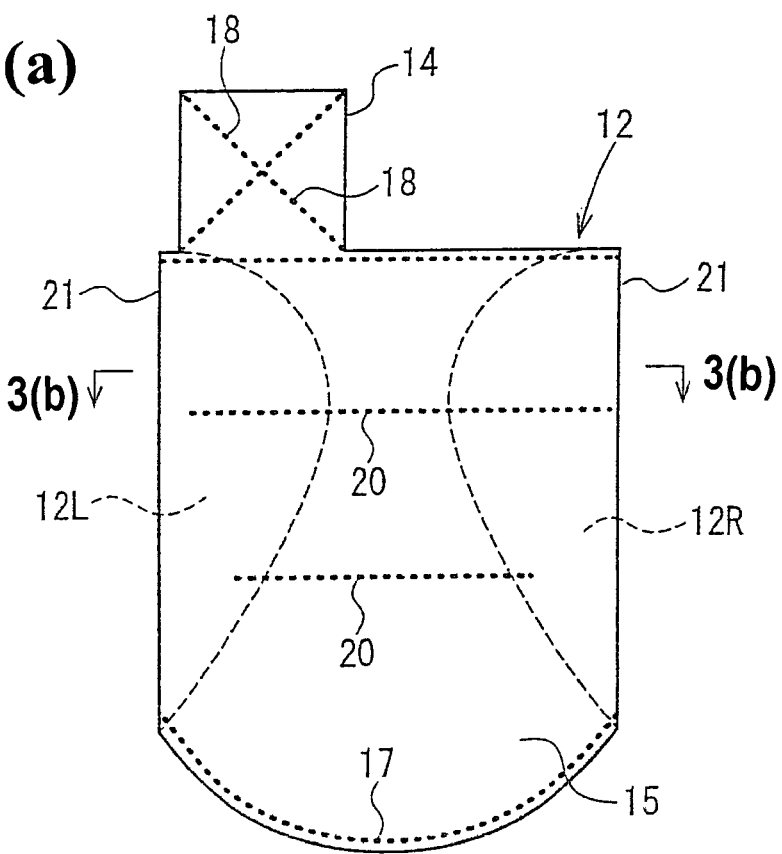
FIGS. 3(a) to 3(c) are explanatory views showing a process of folding the airbag shown in FIGS. 1(a) and 1(b)
Figure 3B:
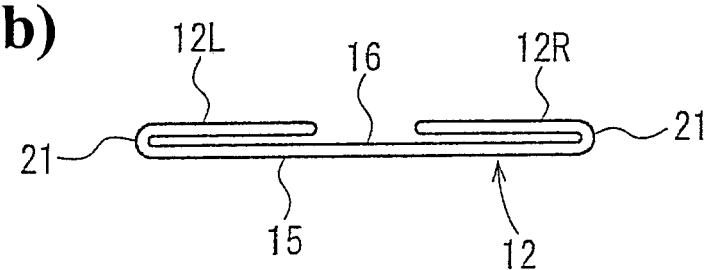
Figure 3C:
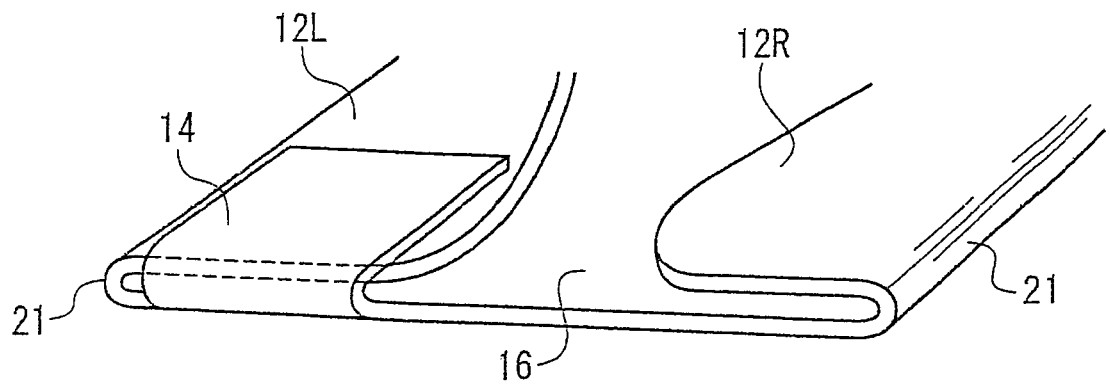
Figure 5:
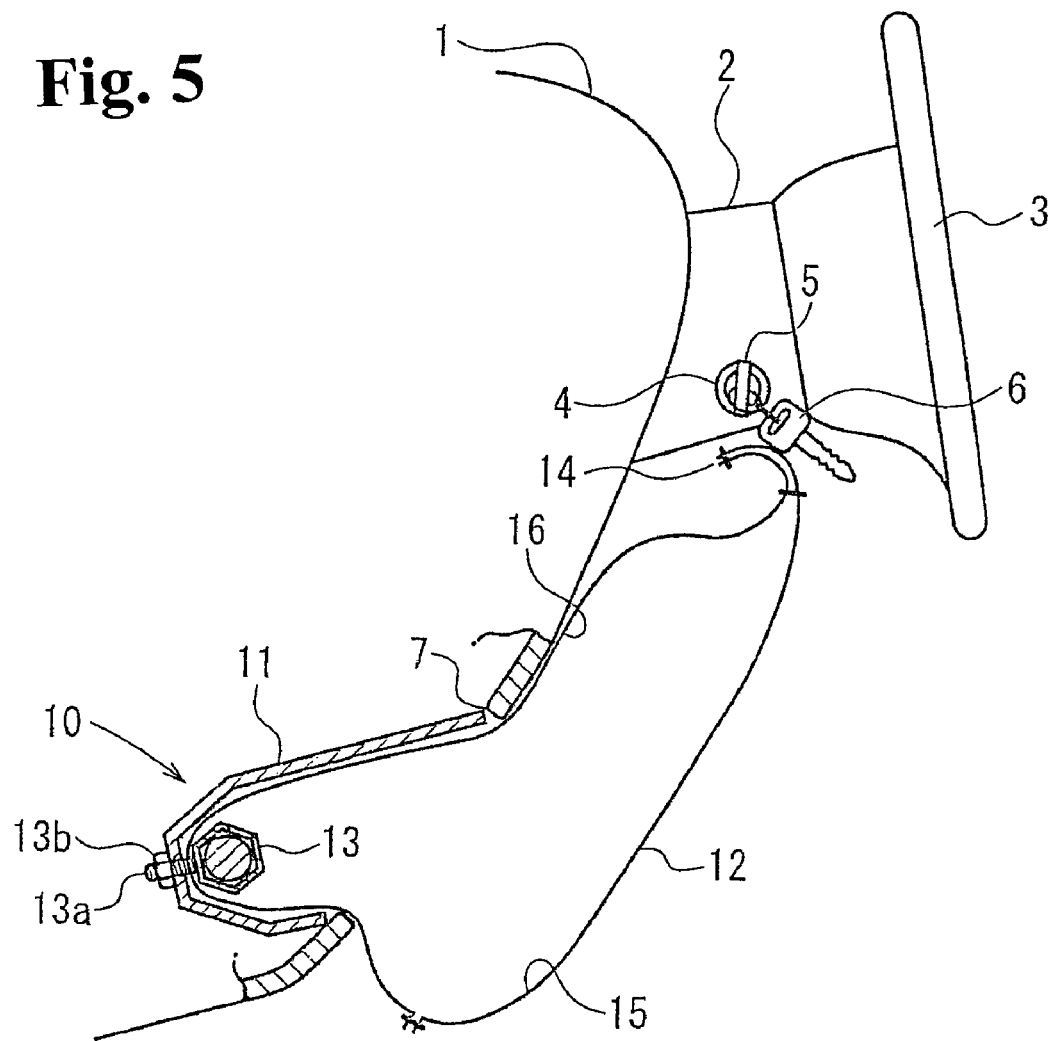
FIG. 5 is a vertical sectional view showing the process of inflating the airbag of the leg-protection device shown in FIGS. 1(a) and 1(b)
Figure 6:
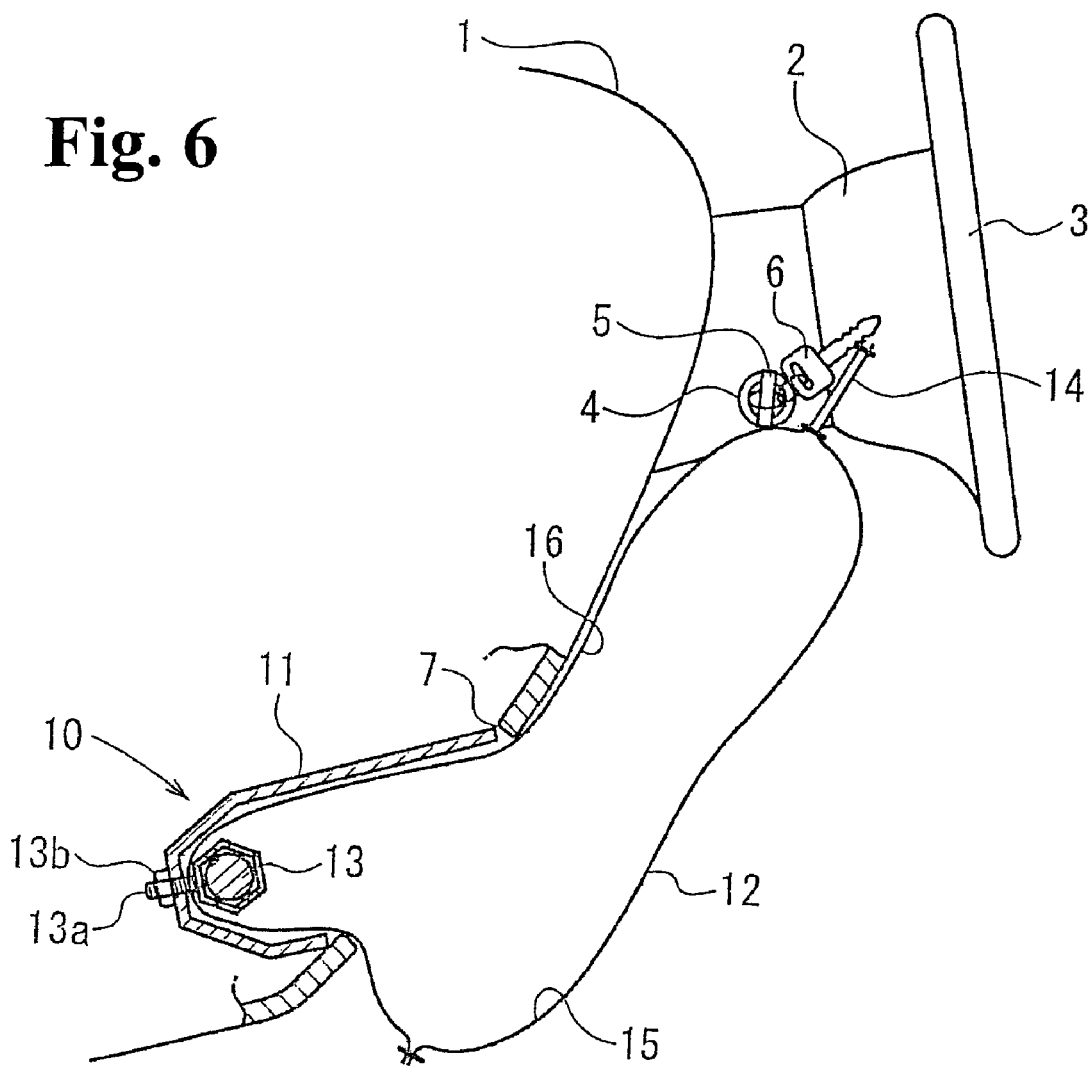
FIG. 6 is a vertical sectional view showing the process of inflating the airbag of the leg-protection-device shown in FIGS. 1(a) and 1(b)

Hereunder, embodiments of the present invention will be described with reference to the accompanying drawings. FIG. 1(a) is a front view of an airbag in a leg-protection device for a vehicle occupant according to an embodiment of the present invention, and FIG. 1(b) is an enlarged view of a part 1(b) shown in FIG. 1(a). FIG. 2 is an exploded perspective view of the airbag. FIG. 3(a) is a front view showing the airbag in a partially folded state, FIG. 3(b) is a sectional view taken along line 3(b)-3(b) in FIG. 3(a), and FIG. 3(c) is a perspective view showing a state in which a projecting member is bent. FIGS. 4 to 6 are vertical sectional views showing a process of inflating the airbag. In the following description, a left-right direction refers to a width direction of the vehicle and the left-right direction in FIG. 1(a).

As shown in FIGS. 4 to 6, an instrument panel 1 is provided in front of a driver seat of a vehicle, and a steering-column cover 2 is provided to cover a steering column (not shown) projecting from the instrument panel 1. A steering wheel 3 is fixed to a steering shaft (not shown) projecting from the steering column.

In the present embodiment, a keyhole 4 is provided on a left side (as seen from the driver) of the steering-column cover 2. A key 5 is inserted in the keyhole 4, and a key chain 6 (shown as another key in FIGS. 4 to 6) is attached to the key 5. As shown in FIG. 4, the key chain 6 is hung down beyond a bottom surface of the steering-column cover 2 in a normal state (state in which the key chain 6 is not pushed up by a projecting member 14 as described below).

A leg-protection device 10 for a vehicle occupant is installed below the steering-column cover 2. The leg-protection device 10 includes a container-shaped case 11 having an opening (no reference numeral) in a front surface thereof facing the occupant, an airbag 12 connected to the case 11, and a gas generator 13 for inflating the airbag 12. The case 11 is fitted in an airbag-inflation opening 7 formed in the instrument panel 1 at a position below the steering-column cover 2. In a normal state, the airbag 12 is contained in the case 11 in a folded state, and a lid (not shown) is attached to cover the opening in the front surface of the case 11 containing the folded airbag 12. When the airbag 12 is inflated, the airbag 12 pushes the lid to open the airbag-inflation opening 7.

When the airbag 12 receives gas from the gas generator 13, the airbag 12 starts inflating through the airbag-inflation opening 7 toward the front of the instrument panel 1, and deploys upwardly along the instrument panel 1 in a region below the steering-column cover 2 and then along a bottom surface of the steering-column cover 2 as shown in FIGS. 4 to 6.

As shown in FIG. 1(a), in the present embodiment, the airbag 12 is shaped such that a size thereof in the left-right direction (the width direction of the vehicle) increases toward a top, and a top of the airbag 12 is larger than a size of the steering-column cover 2 in the left-right direction. When the airbag 12 is inflated along the bottom surface of the steering-column cover 2, an upper portion of the airbag 12 faces the bottom surface of the steering-column cover 2 at the central region thereof, and extends beyond the left and right sides of the steering-column cover 2 at the left and right regions thereof.

The airbag 12 has the projecting member 14 projecting upwardly from a top edge of the airbag 12 when the airbag 12 is inflated. In the present embodiment, the projecting member 14 is provided on the top edge of the airbag 12. Therefore, as shown in FIG. 6, when the airbag 12 is inflated along the bottom surface of the steering column cover 2, the projecting member 14 projects upwardly along a left side surface of the steering column cover 2, that is, along the side surface with the keyhole 4.

In the present embodiment, an outer shell of the airbag 12 is formed of a front panel 15 facing the occupant and a rear panel 16 facing the instrument panel 1 (steering-column cover 2), as shown in FIG. 2. The front panel 15 and the rear panel 16 are sewn together at a periphery thereof to form a bag shape. Reference numeral 17 denotes a seam at the periphery.

The projecting member 14 is formed integrally with the airbag 12. More specifically, as shown in FIG. 2, in the present embodiment, projecting tabs 15a and 16a project from the top edges of the front panel 15 and the rear panel 16, respectively, in left regions thereof. The projecting member 14 is formed by sewing them together, as shown in FIG. 1(b). Reference numeral 18 denotes seams between the projecting tabs 15a and 16a. In the present embodiment, the seams 18 extend along the diagonal lines of the projecting tabs 15a and 16a in an X shape.

In the present embodiment, as shown in FIG. 2, the airbag 12 is provided with tethers 19 connecting the front panel 15 and the rear panel 16 so as to limit the inflation of the airbag 12 in the thickness direction thereof. Reference numeral 20 denotes seams sewing the tethers 19 to the front panel 15 and the rear panel 16. In the present embodiment, the tethers 19 are continuous in the left-right direction, and a plurality of (two in the present embodiment) tethers 19 is arranged in the vertical direction. Left and right ends of each tether 19 are separated from left and right edges of the airbag 12, and spaces for communicating are provided between them. For simplification, the tethers 19 are not shown in FIGS. 4 to 6.

The gas generator 13 is disposed in the airbag 12. More specifically, a stud bolt 13a projecting from a holder (no reference numeral) of the gas generator 13 is inserted through a lower potion of the rear panel 16 of the airbag 12 and a rear wall of the case 11, and is screwed into a nut 13b. Thus, due to the engagement between the stud bolt 13a and the nut 13b, the gas generator 13 is fixed to the case 11, and a lower portion of the rear panel 16 of the airbag 12 is clamped between the holder of the gas generator 13 and the rear wall of the case 11.

In the present embodiment, when the airbag 12 is folded, first, the airbag 12 is pulled out from the case 11 and spread. As shown in FIGS. 3(a) and 3(b), left and right portions 12L and 12R of the airbag 12 are folded along vertical folding lines 21 such that the rear panel 16 faces inwardly. Then, as shown in FIG. 3(c), the projecting member 14 is bent over to a side of the rear panel 16 along a bottom side thereof and is laminated on the folded left portion 12L. The airbag 12 is rolled from the top to the bottom, and is put into the case 11 in the rolled state. At this time, the airbag 12 is rolled such that the rear panel 16 faces the center of the roll and the front panel 15 faces outwardly. After the rolled airbag 12 is put into the case 11, the lid is attached to the case 11. Thus, the leg-protection device 10 is completed.

When the vehicle having the leg-protection device 10 described above collides, the gas generator 13 discharges gas to inflate the airbag 12. More specifically, the airbag 12 pushes and opens the lid, and is inflated through the airbag-inflation opening 7 toward the front of the instrument panel 1. The airbag 12 deploys upwardly along the front surface of the instrument panel 1. As the airbag 12 deploys upwardly, the airbag 12 is unrolled in a manner shown in FIGS. 4 and 5. When the airbag 12 is unrolled to the top, the left and right portions 12L and 12R folded such that the rear panel 16 faces inwardly start to deploy around the vertical folding lines 21. Accordingly, the projecting member 14 laminated on the left portion 12L bounces upwardly when the left portion 12L deploys, and the projecting member 14 projects upwardly from the top edge of the airbag 12, as shown in FIG. 6.

The projecting member 14 projects upwardly from the top edge of the airbag 12. Accordingly, even if the key chain 6 hangs down below the steering-column cover 2 when the airbag 12 deploys along the bottom surface of the steering-column cover 2, the projecting member 14 contacts and pushes the key chain 6 upwardly before the airbag 12 contacts the key chain 6, as shown in FIGS. 5 and 6. Accordingly, the airbag 12 is prevented-from being interfered by the key chain 6 when the airbag 12 deploys in the space below the steering-column cover 2.

The projecting member 14 pushes the key chain 6 upwardly before the airbag 12, thereby reducing a speed of moving the key chain 6 as compared to a case in which the airbag 12 directly pushes the key chain 6 upwardly when the airbag 12 is inflated. In addition, since the projecting member 14 contacts the key chain 6, the airbag 12 receives a repulsive force in the direction opposite to the inflating direction thereof via the projecting member 14, thereby reducing a speed of inflating the airbag 12 immediately before the end of the inflation.

Figure 7A:
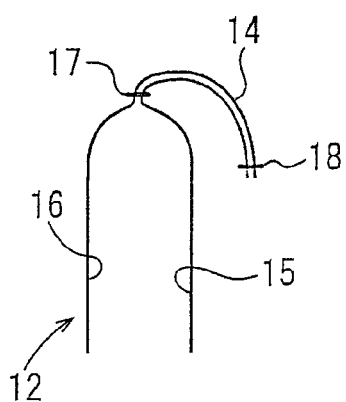
FIGS. 7(a) and 7(b) are views for explaining methods of folding a projecting member.
Figure 7B:
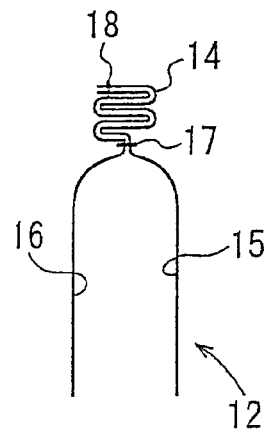
Figure 8A:
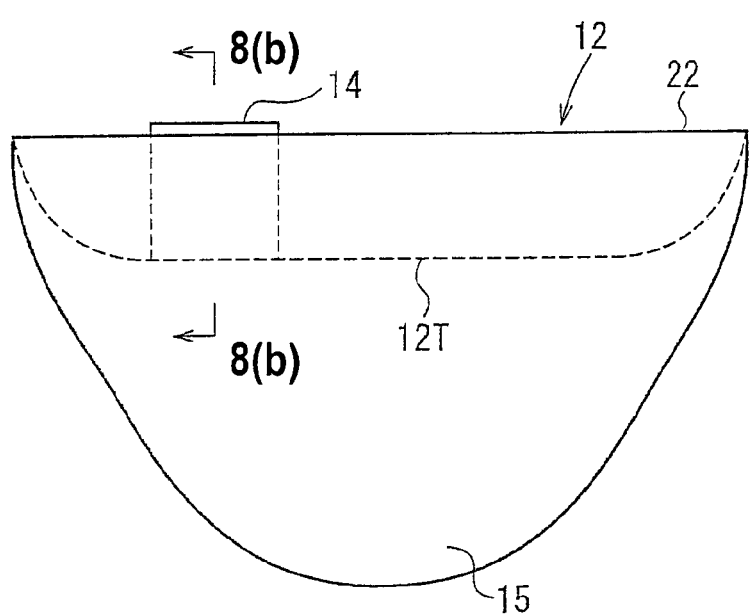
FIGS. 8(a) and 8(b) are views for explaining methods of folding the projecting member.
Figure 8B:
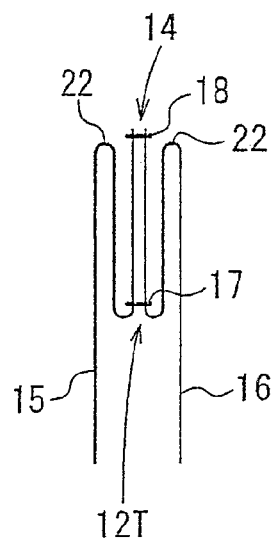
Figure 10:
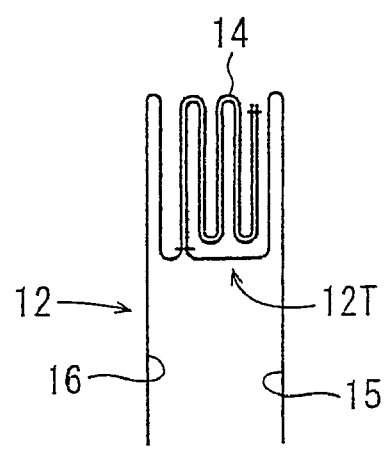
FIG. 10 is a view for explaining a method for folding the projecting member.

In the embodiment, the projecting member 14 is bent over to the side of the rear panel 16 when the airbag 12 is folded. The method of folding the projecting member 14 is not limited to this. FIGS. 7(a), 7(b), 8(a), 8(b) and 10 show other methods of folding the projecting member. FIGS. 7(a), 7(b), and 10 are vertical sectional views of the upper portion of the airbag. FIG. 8(a) is a front view of the airbag, and FIG. 8(b) is a sectional view taken along line 8(b)-8(b) in FIG. 8(a).

As shown in FIG. 7(a), the projecting member 14 is bent over to a side of the front panel 15 of the airbag 12. As shown in FIG. 7(b), the projecting member 14 is folded from the front end to the base end in a zigzag shape (accordion shape). Instead of the zigzag shape, the projecting member 14 may also be folded in a roll shape, a winding shape, etc., or a combination of different shapes. In addition, the projecting member 14 may also be bent over to the side of the front panel 15 or the rear panel 16 of the airbag 12, and may be disposed on the front panel 15 or the rear panel 16 in a folded manner.

As shown in FIGS. 8(a) and 8(b), the upper portion of the airbag 12 is bent inwardly along horizontal folding lines 22 such that the folded part is tucked in and a pleat 12T is formed. In this case, the projecting member 14 is also tucked in with the pleat 12T. When the airbag 12 is folded as shown in FIGS. 8(a) and 8(b), the pleat 12T is pushed straight up toward the outside of the airbag 12 when the airbag 12 is inflated. Due to the upward movement of the, pleat 12T, the projecting member 14 is pushed straight up by the pleat 12T.

As shown in FIG. 10, the projecting member 14 may also be folded in a zigzag shape (accordion shape), a roll shape, etc., and may be tucked in with the pleat 12T.

Figure 11A:
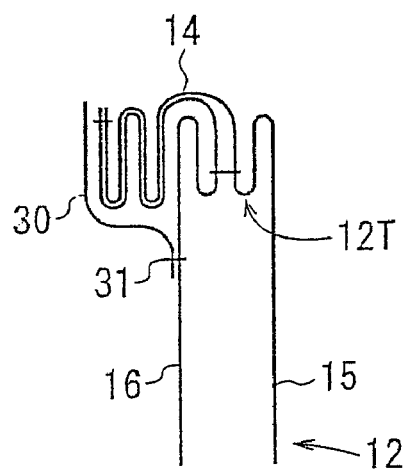
FIGS. 11(a) to 11(d) are views showing structures in which a cover cloth is disposed.

In the present invention, a cover cloth for covering the projecting member in a folded state may also be provided. FIGS. 11(a) to 11(d) are vertical sectional views showing airbags provided with cover cloths. As shown in FIG. 11(a), a pleat 12T is formed by folding an upper portion of an airbag 12 inwardly. A base end of a projecting member 14 is positioned on the pleat 12T, and a front end of the projecting member 14 extending from the pleat 12T is folded on the rear panel 16 in a zigzag shape (accordion shape), and is covered with a cover cloth 30 provided on the rear panel 16.

The cover cloth 30 is formed in a rectangular shape and at least a bottom side thereof is sewn to the rear panel 16 with a seam 31. Instead of sewing, the cover cloth 30 may also be attached with heat sealing or adhesion. The cover cloth 30 may be bonded to the rear panel only at a bottom side or at least one of the left and right sides. Since the folded projecting member 14 is covered with the cover cloth 30, the folded shape of the projecting member 14 is maintained.

Figure 11B:
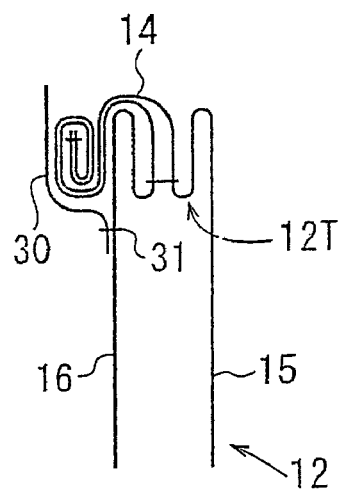

As shown in FIG. 11(b), the projecting member 14 is folded in a roll shape instead of the zigzag shape, and is positioned between the rear panel 16 and the cover cloth 30. As described above, the projecting member 14 may be folded in various shapes other then the shapes shown in the figures, and may also be folded in a combination of different shapes.

Figure 11C:
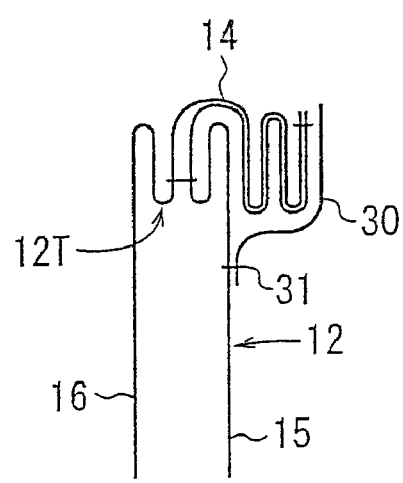
Figure 11D:
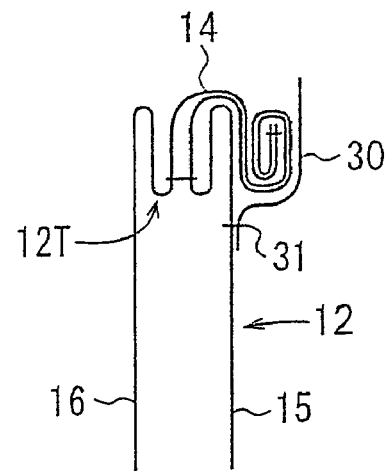

As shown in FIGS. 11(a) and 11(b), the projecting member 14 is disposed on the rear panel 16 of the airbag 12 in the folded state. As shown in FIGS. 11(c) and 11(d), the projecting member 14 is disposed on the front panel 15 in the folded state. In FIGS. 11(c) and 11(d), the cover cloth 30 is attached to the front panel 15. The folded projecting member 14 is positioned between the front panel 15 and the cover cloth 30 and is covered with the cover cloth 30. The projecting member 14 is folded in a zigzag shape in FIG. 11(c), and is folded in a roll shape in FIG. 11(d). The folded shape of the projecting member 14 is not limited to them.

Figure 12:
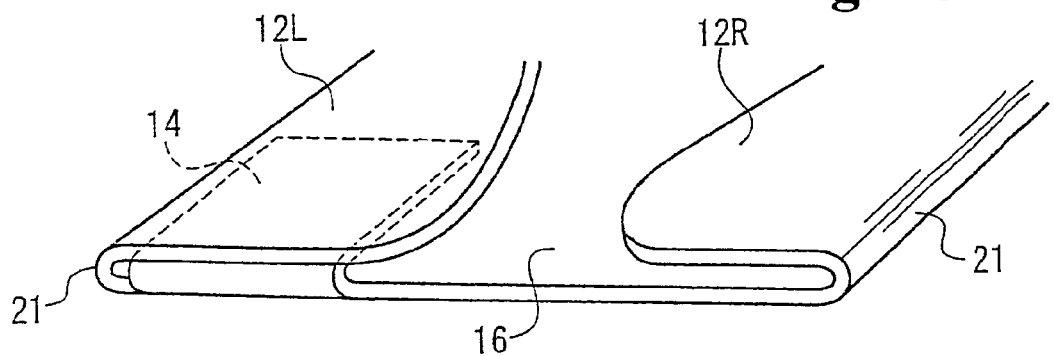
FIG. 12 is a view for explaining a method of folding the projecting member.

The projecting member 14 is laminated on the left portion 12L of the airbag 12 shown in FIG. 3(c). The projecting member 14 may also be placed between the left portion 12L of the airbag 12 and the central portion of the rear panel 16, as shown in FIG. 12. This embodiment is suitable for a case when the cover cloth 30 is provided, as shown in FIGS. 11(a) to 11(d). In this case, first, the projecting member 14 is folded and is covered with the cover cloth 30, and the side portions of the airbag are folded. Then, the overall body of the airbag is folded.

In the embodiment shown in FIGS. 1(*a*) to 6, the projecting tabs 15*a* and 16*a* project from the top edges of the front panel 15 and the rear panel 16 of the airbag 12, respectively. The projecting tabs 15*a* and 16*a* are sewn together with the seams 18 extending along diagonal lines of the projecting tabs 15*a* and 16*a* in a shape of letter X. The structure of bonding the projecting tabs 15*a* and 16*a* together is not limited to this.

Figure 9A:
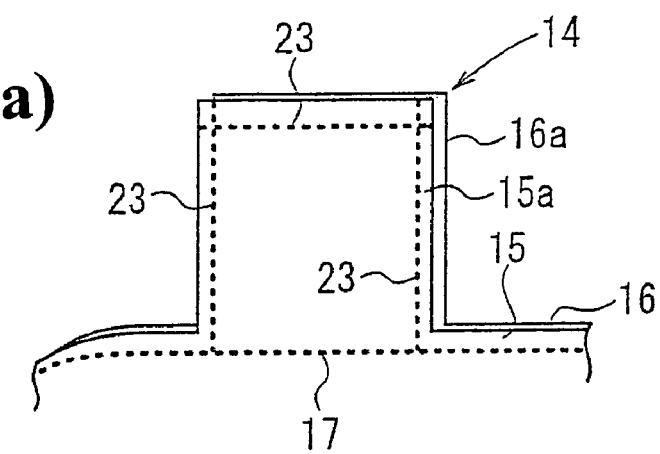
FIGS. 9(a) to 9(c) are views showing structures for bonding projecting tabs together.
Figure 9B:
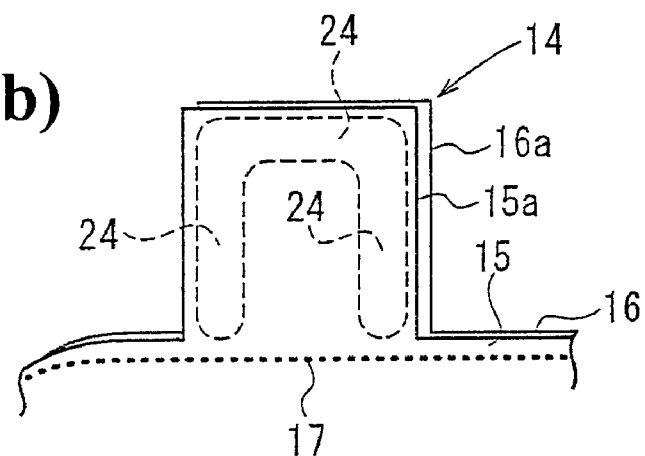
Figure 9C:
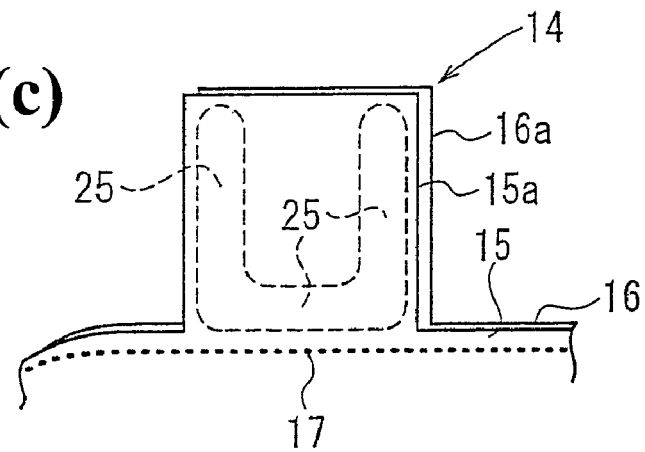

FIGS. 9(*a*) to 9(*c*) are perspective views showing other structures of bonding the projecting tabs together. As shown in FIG. 9(*a*), the projecting tabs 15*a* and 16*a* are sewn together along top, left, and right sides thereof with seams 23. As shown in FIGS. 9(*b*) and 9(*c*), the projecting tabs 15*a* and 16*a* are bonded together by applying an adhesive between opposing surfaces thereof. As shown in FIG. 9(*b*), the projecting tabs 15*a* and 16*a* are adhered to each other by applying an adhesive 24 along the top, left, and right sides thereof. As shown in FIG. 9(*c*), the projecting tabs 15*a* and 16*a* are adhered to each other by applying an adhesive 25 along bottom side (side parallel to a seam 17) and the left and right sides thereof.

In the case in which the projecting tabs 15*a* and 16*a* are adhered to each other, the adhesive may be a hardening type. In such a case, a posture of the projecting member 14 is stabilized when the projecting member 14 pushes the key chain or the like upwardly.

In the embodiments, the front panel 15 and the rear panel 16 are both provided with the projecting tabs 15*a* and 16*a*, respectively, and the projecting member 14 is formed by bonding the projecting tabs 15*a* and 16*a* together. The projecting tab may also be provided on only one of the front panel 15 and the rear panel 16 as the projecting member.

Figure 13:
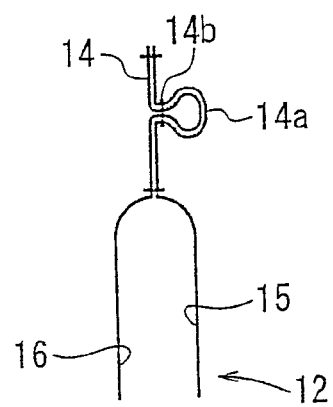
FIG. 13 is a view for explaining a method of folding the projecting member.

The projecting member may also be provided with a reinforcing material for stabilizing the posture of the projecting member when the projecting member pushes the key chain or the like upward. FIG. 13 is a sectional view of an airbag according to another embodiment of the present invention. In this embodiment, a loop 14*a* is provided at a middle of the projecting member 14. Reference numeral 14*b* denotes a seam at a bottom of the loop 14*a*. The loop 14*a* is disposed on an outside of the projecting member 14 when the projecting member 14 is bent over to a side of the rear panel 16.

Since the projecting member 14 has the loop 14*a*, the projecting member 14 contacts the key chain or the like softly when the airbag 12 is inflated. More specifically, since the loop 14*a* is provided at the middle of the projecting member 14, a thickness of the projecting member 14 increases and a contact area between the projecting member 14 and the key chain or the like increases accordingly. Therefore, the key chain or the like more easily contacts the projecting member 14. In addition, the key chain or the like is more easily pushed away since the loop 14*a* contacts first, and the airbag 12 is reliably prevented from being interfered by the key chain or the like. The seam 14*b* may be formed to break or not to break when the seam 14*b* contacts the key chain or the like. Two or more loops 14*a* may be provided. In addition, the loop 14*a* may be provided on the outside of the projecting member 14 when the projecting member 14 is bent over to the side of the front panel 15.

Figure 14:
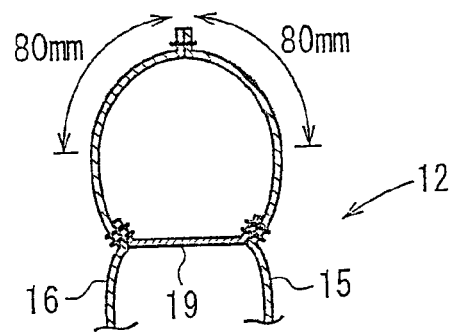
FIG. 14 is a sectional view for explaining a dimension of the airbag.

The above-described-embodiments simply show the examples of the present invention, and the present invention is not limited to the embodiments. As shown in FIG. 14, it is preferable that the airbag 12 has a length of about 80 mm from the top end thereof to positions of the front and rear panels at which the thickness of the top chamber of the airbag becomes maximum. The present invention is not limited to this structure.

Figure 15A:
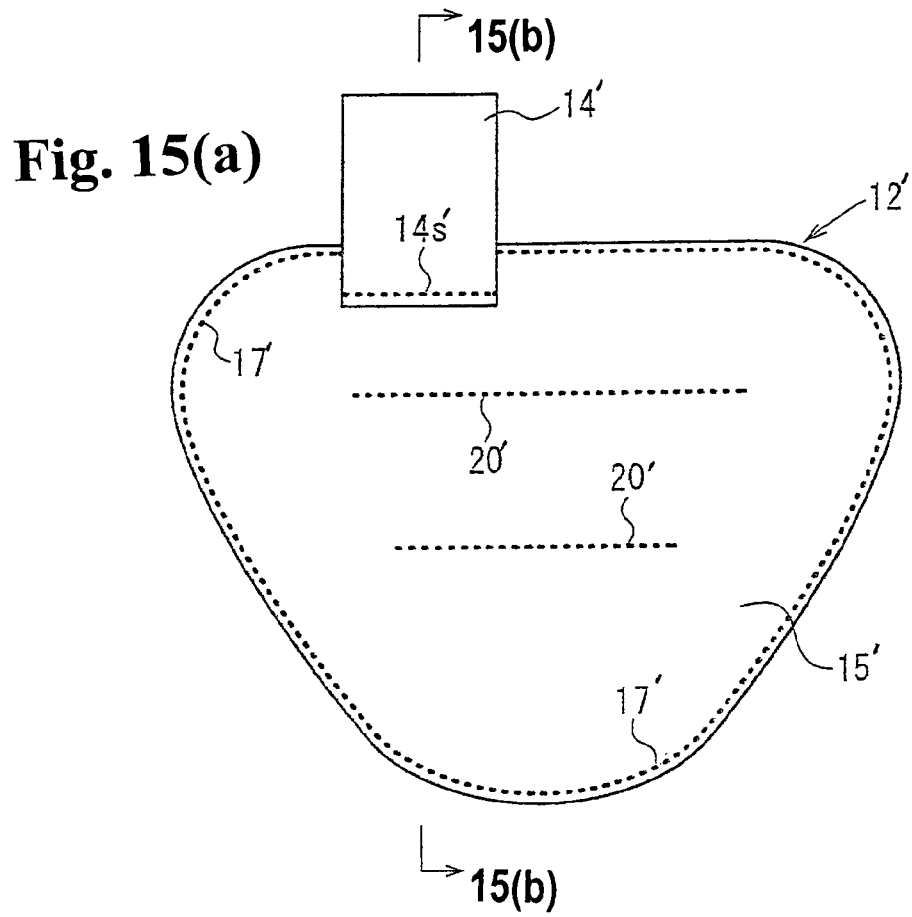
FIGS. 15(a) and 15(b) are views showing an airbag of a leg-protection device for a vehicle occupant according to another embodiment of the present invention.
Figure 15B:
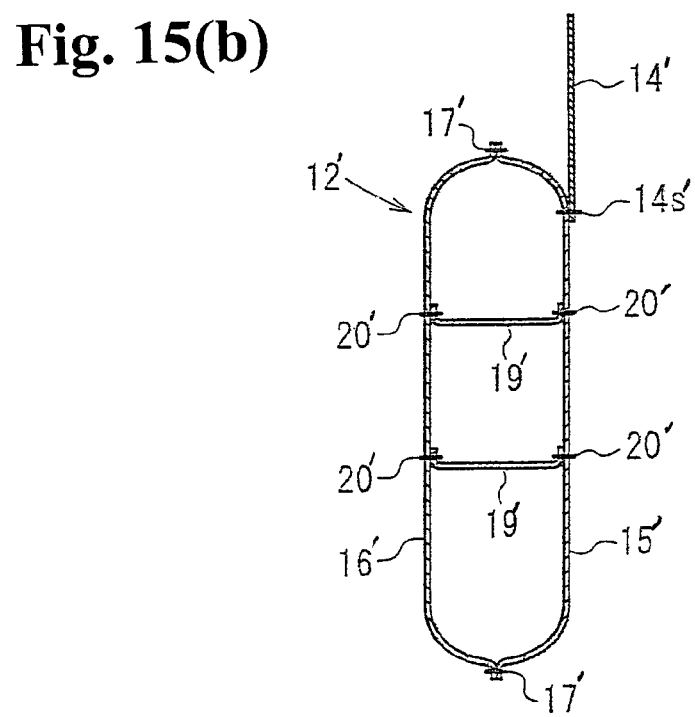
Figure 16A:
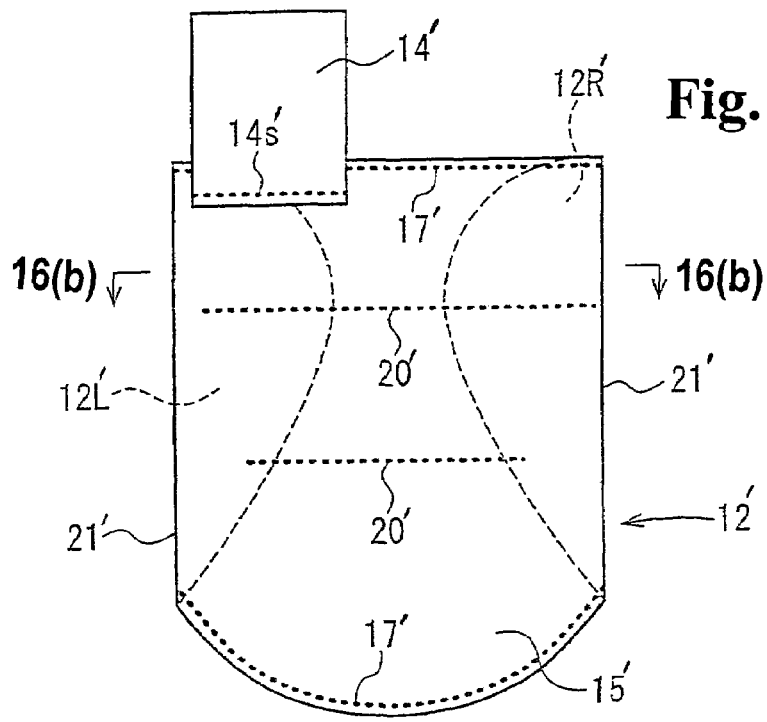
FIGS. 16(a) to 16(c) are explanatory views showing a process of folding the airbag shown in FIG. 15(a)
Figure 16B:
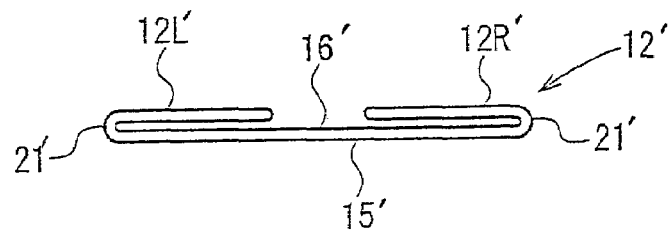
Figure 16C:
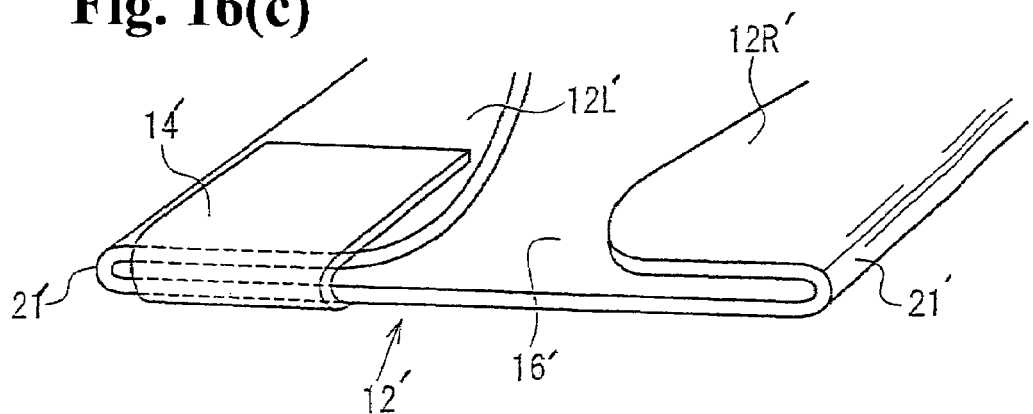
Figure 17:
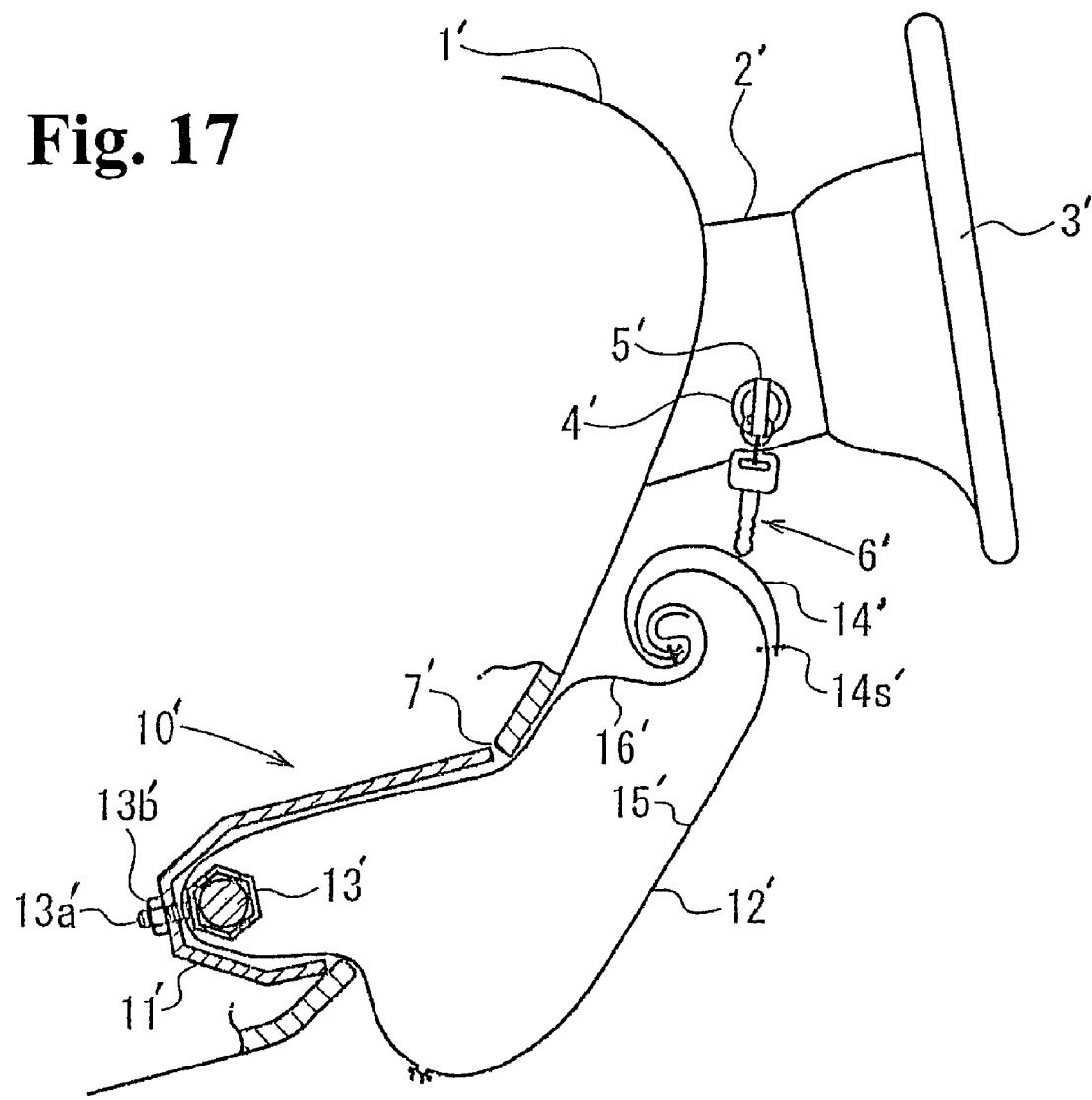
FIG. 17 is a vertical sectional view showing a process of inflating the airbag of the leg-protection device shown in FIG. 15(a)
Figure 18:
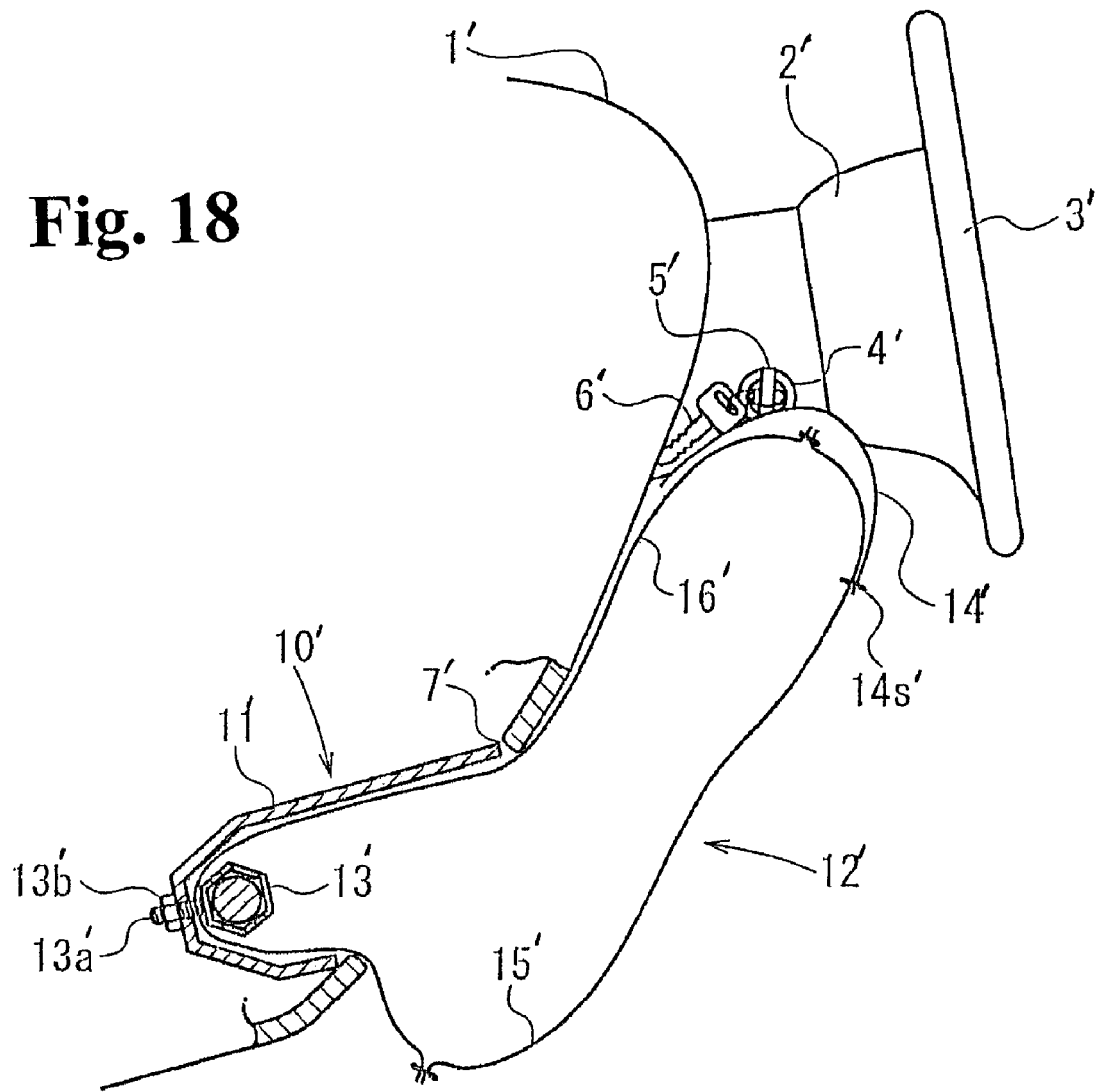
FIG. 18 is a vertical sectional view showing the process of inflating the airbag of the leg-protection device shown in FIG. 15(a)

FIG. 15(*a*) is a front view of an airbag included in a leg-protection device for a vehicle occupant according to another embodiment of the present invention, and FIG. 15(*b*) is a sectional view taken along line 15(*b*)-15(*b*) in FIG. 15(*a*). FIG. 16(*a*) is a front view showing the airbag in a partially folded state, FIG. 16(*b*) is a sectional view taken along line 1-6(*b*)-16(*b*) in FIG. 16(*a*), and FIG. 16(*c*) is a perspective view showing a state in which a flap as a projecting member is bent. FIGS. 17 and 18 are vertical sectional views showing a process of inflating the airbag. In the following description, a left-right direction refers to a width direction of a vehicle, and a left-right direction in FIG. 15(*a*).

As shown in FIGS. 17 and 18, an instrument panel 1' is provided in front of a driver seat of a vehicle, and a steering-column cover 2' is provided to cover a steering column (not shown) projecting from the instrument panel 1'. A steering wheel 3' is fixed to a steering shaft (not shown) projecting from the steering column.

In the present embodiment, a keyhole 4' is provided in a left side (as seen from a driver) of the steering-column cover 2'. A key 5' is inserted in the keyhole 4', and a key chain 6' (shown as another key in FIGS. 17 and 18) is attached to the key 5'. As shown in FIG. 17, the key chain 6' hangs down beyond a bottom surface of the steering-column cover 2' in a normal state (state in which the key chain 6' is not pushed up by a flap 14' or the projecting member; described below). A leg-protection device 10' for a vehicle occupant is installed below the steering-column cover 2'. The leg-protection device 10' includes a container-shaped case 11' having an opening (no reference numeral) in a front surface facing the occupant, an airbag 12' connected to the case 11', and a gas generator 13' for inflating the airbag 12'.

The case 11' is fitted in an airbag-inflation opening 7' formed in the instrument panel 1' at a position below the steering-column cover 2'. In a normal state, the airbag 12' is contained in the case 11' in a folded state, and a lid (not shown) is provided for covering the opening in the front surface of the case 11' containing the airbag 12'. When the airbag 12' is inflated, the lid is pushed by the airbag 12' to open the airbag-inflation opening 7'.

The airbag 12' receives gas from the gas generator 13', and starts inflating through the airbag-inflation opening 7' toward the front of the instrument panel 1'. The airbag 12' deploys upwardly along the instrument panel 1' in a region below the steering-column cover 2' and then along the bottom surface of the steering-column cover 2', as shown in FIGS. 17 and 18.

As shown in FIG. 15(*a*), in the present embodiment, the airbag 12' is shaped such that a size thereof in the left-right direction (the width direction of the vehicle) increases toward a top and the top of the airbag 12' is larger than a size of the steering-column cover 2' in the left-right direction. When the airbag 12' is inflated along the bottom surface of the steering-column cover 2', an upper portion of the airbag 12' faces the bottom surface of the steering-column cover 2' at a central region thereof and extends beyond left and right sides of the steering-column cover 2' at left and right regions thereof.

The airbag 12' has the flap 14' as the projecting member projecting upwardly from the top edge of the airbag 12' (the front end of the airbag 12' in the inflating direction) when the airbag 12' is inflated. In the present embodiment, the flap 14' is disposed on the upper left position of the airbag 12'. An outer shell of the airbag 12' is formed of a front panel 15' facing the occupant and a rear panel 16' facing the instrument panel 1' (steering-column cover 2'). The front panel 15' and the rear panel 16' are sewn together at a periphery thereof to form a bag shape. Reference numeral 17' denotes the seam at the periphery.

The flap 14' is formed independently of the front panel 15' and the rear panel 16'. One end (base end) of the flap 14' is sewn to the front panel 15' at a position near a top edge thereof as shown in FIG. 15(*b*), and the other end (front end) is disposed on a side of the rear panel 16' such that the flap 14' extends over the upper portion of the airbag 12'. Reference numeral 14s' denotes a seam sewing the base end of the flap 14' to the front panel 15'. As shown in the figure, the front end of the flap 14' is a free end (free from the rear panel 16').

In the present embodiment, as shown in FIG. 15(*b*), the airbag 12' is provided with tethers 19' connecting the front panel 15' and the rear panel 16' so as to limit the inflation of the airbag 12' in a thickness direction thereof. Reference numeral 20' denotes seams sewing the tethers 19' to the front panel 15' and the rear panel 16'. The tethers 19' are continuous in the left-right direction, and a plurality of (two in the present embodiment) tethers 19' is arranged in the vertical direction. Left and right ends of each tether 19' are separated from left and right edges of the airbag 12', and communicating spaces are provided between them. For simplification, the tethers 19' are not shown in FIGS. 17 and 18.

The gas generator 13' is disposed in the airbag 12'. More specifically, a stud bolt 13*a'* projecting from a holder (no reference numeral) of the gas generator 13' is inserted through a lower potion of the rear panel 16' of the airbag 12' and a rear wall of the case 11' and a nut 13*b'* is tightened to the stud bolt 13*a'*. Due to the engagement between the stud bolt 13*a'* and the nut 13*b'*, the gas generator 13' is fixed to the case 11', and the lower portion of the rear panel 16' of the airbag 12' is clamped between the holder of the gas generator 13' and the-rear wall of the case 11'.

In the present embodiment, when the airbag 12' is folded, first, the airbag 12' is pulled out from the case 11' and is spread. Then, as shown in FIGS. 16(*a*) and 16(*b*), left and right portions 12L' and 12R' of the airbag 12' are folded along vertical folding lines 21' such that the rear panel 16' faces inwardly. As shown in FIG. 16(*c*), the flap 14' is bent over to a side of the rear panel 16', and a front-end portion of the flap 14' is laminated on the folded left portion 12L'. The airbag 12' is rolled from top to bottom, and is put into the case 11' in a rolled state. At this time, the airbag 12' is rolled such that the rear panel 16' faces the center of the roll and the front panel 15' faces outwardly. After the rolled airbag 12' is put into the case 11', the lid is attached to the case 11'. Thus, the leg-protection device 10' is completed.

When the vehicle having the leg-protection, device 10' described above collides, the gas generator 13' discharges gas and the airbag 12' starts to inflate. More specifically, the airbag 12' pushes and opens the lid, and starts inflating through the airbag-inflation opening 7' toward the front of the instrument panel 1'. The airbag 12' then deploys upwardly along the front surface of the instrument panel 1'. The rolled airbag 12' deploys upwardly while rotating in a direction from the instrument panel 1' to the occupant viewed from above. Because of this rotation, when the airbag 12' is unrolled to the top, the top edge of the airbag 12' moves upwardly along a curve in a direction from the instrument panel 1' toward the occupant, as shown in FIGS. 17 and 18. At this time, the front-end portion of the flap 14' is pushed upward by the top edge of the airbag 12' and projects upwardly beyond the top edge of the airbag 12'.

In the present embodiment, when the airbag 12' is unrolled to the top, the left and right portions 12L' and 12R' folded such that the rear panel 16' faces inwardly start to deploy by rotating around the vertical folding lines 21'. Accordingly, the flap 14' laminated on the left portion 12L' bounces upwardly when the left portion 12L' deploys, and thus the upward movement of the flap 14' is accelerated. Since the flap 14' projects upwardly from the top edge of the airbag 12', even if the key chain 6' hangs down below the steering-column cover 2' when the airbag 12' deploys along the bottom surface of the steering-column cover 2', the flap 14' contacts and pushes the key-chain 6' upwardly before the airbag 12' contacts the key chain 6'. Accordingly, the airbag 12' is prevented from being interfered by the key chain 6' when the airbag 12' deploys in the space below the steering-column cover 2'.

Since the flap 14' pushes the key chain 6' upwardly before the airbag 12', a moving speed of the key chain 6' is reduced as compared to a case in which the airbag 12' directly pushes the key chain 6' upwardly when the airbag 12' is inflated. In addition, since the flap 14' contacts the key chain 6', the airbag 12' receives a repulsive force in the direction opposite to the inflating direction thereof via the flap 14'. Accordingly, the inflation speed of the airbag 12' immediately before the end of the inflation is also reduced.

In the present embodiment, the airbag 12' is rolled from top to bottom such that the rear panel 16' faces the center of the roll. Accordingly, when the airbag 12' is inflated, the airbag 12' is unrolled and rotates on the front portions of the occupant legs. Therefore, the airbag 12' smoothly deploys without being caught by the front portions of the occupant legs.

In the present embodiment, the base end of the flap 14' is attached to the front panel 15' of the airbag 12' at a position near the top edge, and the front end of the flap 14' is disposed on the side of the rear panel 16'. The arrangement of the flap 14' is not limited to this. For example, according to the present invention, the base end of the flap may be attached to the rear panel of the airbag, and the front end thereof may be disposed on the side of the front panel.

Figure 19A:
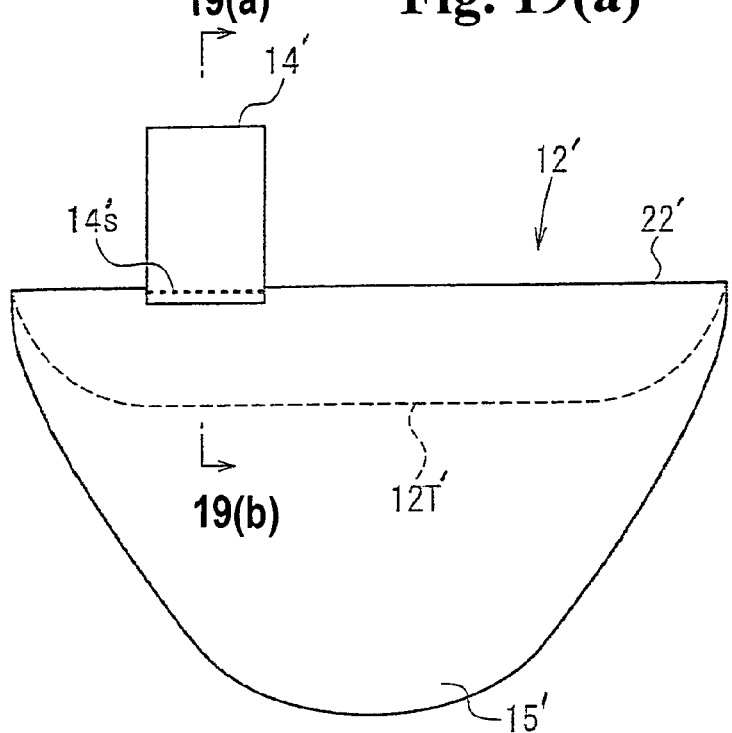
FIGS. 19(a) and 19(b) are explanatory views showing a process of folding the airbag.
Figure 19B:
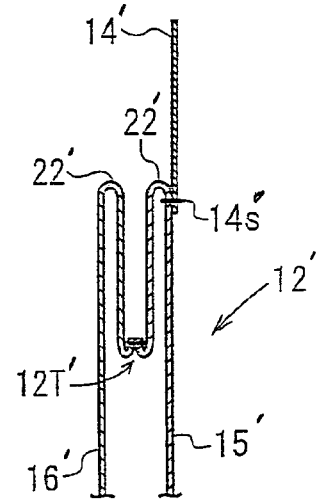

The method of folding the airbag is not limited to the method described above. FIG. 19(*a*) is a front view showing another method of folding the airbag, and FIG. 19(*b*) is a sectional view taken along line 19(*b*)-19(*b*) in FIG. 19(*a*).

In this embodiment, when the airbag 12' is folded, first, the airbag 12' is spread and a part of the upper portion of the airbag 12' above the base end of the flap 14' (above the seam 14s') is folded inwardly along folding lines 22' to be tucked in and form a pleat 12T'. The front-end portion of the flap 14' is bent over the pleat 12T' to the side of-the rear panel 16'. The airbag 12' is folded similarly to the embodiment shown in FIGS. 15(*a*) to 18 except that the upper portion of the airbag 12' is folded inwardly to form the pleat 12T'.

When the airbag 12' with the pleat 12T' at the upper portion thereof is inflated, the pleat 12T' is pushed straight up toward the outside of the airbag 12' due to a gas pressure in the airbag when the upper portion of the airbag is inflated. Due to the upward movement of the pleat 12T', the front-end portion of the flap 14' is pushed upwardly and projects beyond the top edge of the airbag 12'. Accordingly, the flap 14' bounces upward.

Figure 20A:
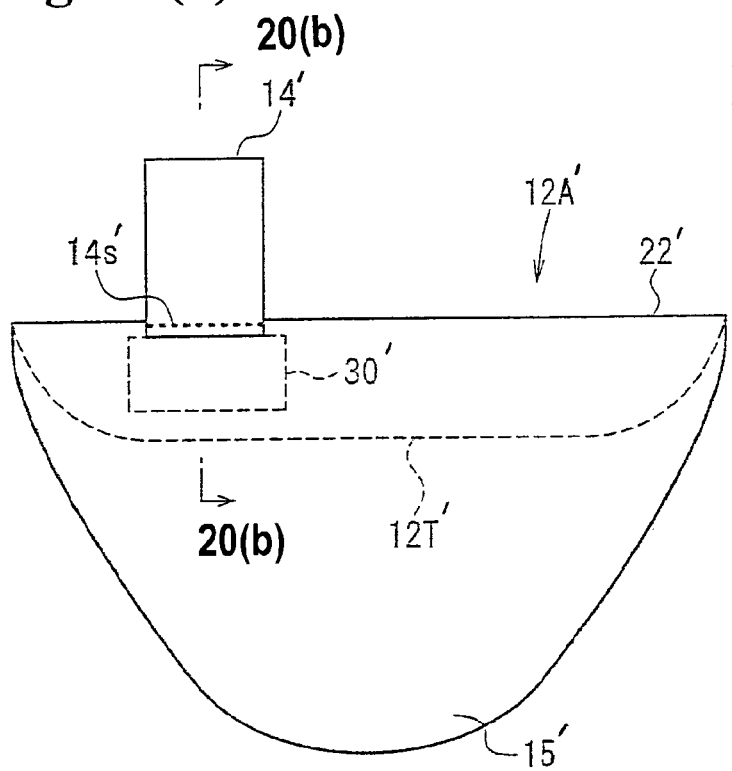
FIG. 20(a) is a front view showing an airbag of a leg-protection device for a vehicle occupant according to a further embodiment of the present invention.
Figure 20B:
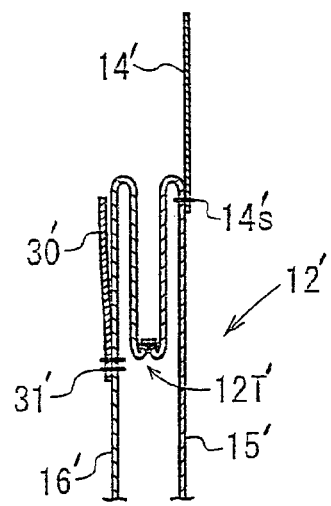
FIG. 20(b) is a sectional view taken along line 20(b)-20(b) in FIG. 20(a)

FIG. 20(*a*) is a front view of an airbag 12A' according to a modification of the airbag shown in FIG. 19(*a*) in which a cover cloth 30' is provided on a rear panel 16' for covering a folded flap (projecting member) 14'. FIG. 20(*b*) is a sectional view taken along line 20(b)-20(b) in FIG. 20(a). FIG. 21 shows sectional views of structures in which the flap 14' is folded.

The cover cloth 30' is formed in a rectangular shape, and at least a bottom side thereof is sewn to the rear panel 16' with a seam 31'. Instead of sewing, the cover cloth 30' may be attached by heat sealing or adhesion. The folded flap 14' is disposed between the cover cloth 30' and the rear panel 16', and is covered-with the cover cloth 30'. The cover cloth 30' may be sewn to the rear panel only at a bottom side or the bottom side and at least one of the left and right sides. Since the folded flap 14' is covered with the cover cloth 30', the folded shape of the flap 14' is maintained.

Figure 21A:
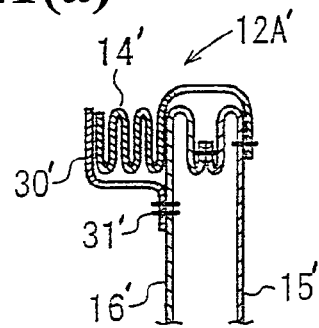
FIGS. 21(a) and 21(b) are vertical sectional views of structures in which a projecting member (flap) is folded in an upper portion of the airbag.
Figure 21B:
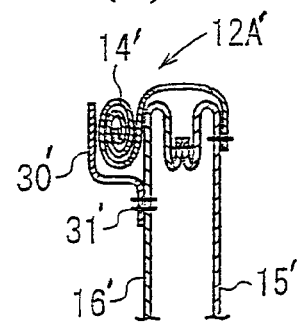

The flap 14' may be folded in an accordion shape as shown in FIG. 21(a), a roll shape as shown in FIG. 21(b), or a combination of the accordion shape and the roll shape (not shown).

Figure 22A:
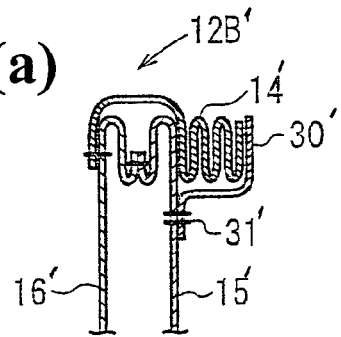
FIGS. 22(a) and 22(b) are vertical sectional views of structures in which the projecting member (flap) is folded in the upper portion of the airbag.
Figure 22B:
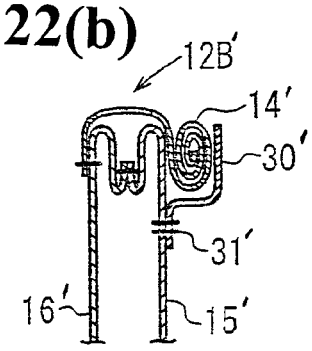

The flap 14' is attached to the front panel 15' and extends over the upper portion of the airbag to the side of the rear panel 16'. As shown in FIGS. 22(a) and 22(b), the flap 14' may be attached to a rear panel 16' and extends over an upper portion of an airbag 12B' to the side of the front panel 15'. In FIGS. 22(a) and 22(b), a cover cloth 30' is attached to the front panel 15' with a seam 31' for covering the flap 14' in the folded state. The flap 14' may be folded in an accordion shape as shown in FIG. 22(a), a roll shape as shown in FIG. 22(b), or a combination of the accordion shape and the roll shape (not shown).

Figure 23:
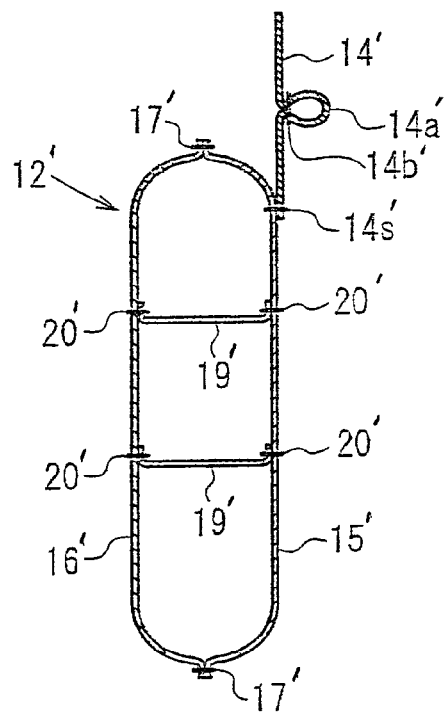
FIG. 23 is a vertical sectional view of an airbag of a leg-protection device for a vehicle occupant according to a still further embodiment of the present invention.

FIG. 23 is a sectional view of an airbag according to a further embodiment of the present invention. In this embodiment, a loop 14a' is provided at the middle of the flap 14'. Reference numeral 14b' denotes a seam at the bottom of the loop 14a'. The loop 14a' is provided at the top of the flap 14' in a state in which the flap 14' extends over the upper portion of the airbag 12'. Since the flap 14' has the loop 14a', the flap 14' contacts the key chain or the like softly when the airbag 12' is inflated. More specifically, since the loop 14a' is provided at the middle of the flap 14', a thickness of the flap 14' is increased and a contact area between the flap 14' and the key chain or the like is increased accordingly. Therefore, the key chain or the like more easily contacts the flap 14'. In addition, the key chain or the like is more easily pushed away when the loop 14a' contacts. Accordingly, the airbag is reliably prevented from being interfered by the key chain or the like. The seam 14b' may be broken or not be broken when it contacts the key chain or the like.

Figure 24:
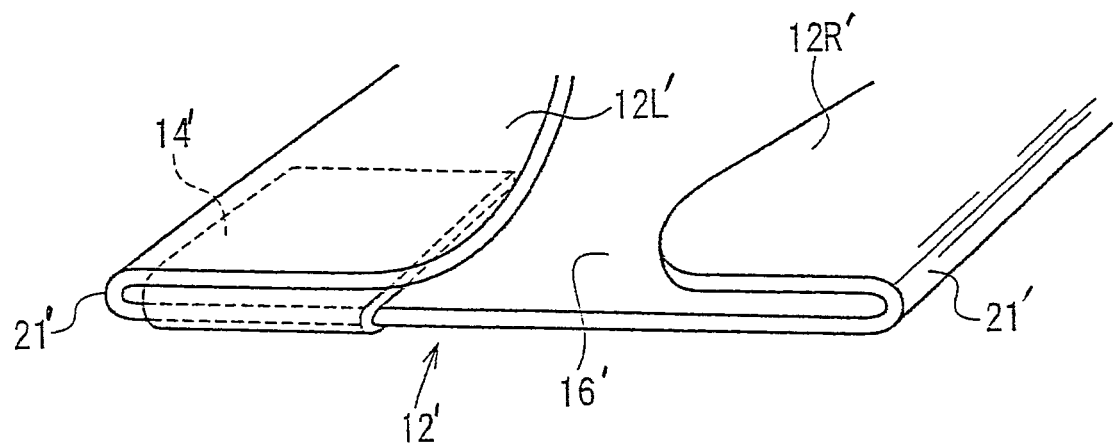
FIG. 24 is a perspective view showing a part of the airbag.

Two or more loops 14a' may be provided. Although the flap 14' is attached to the front panel 15' in FIG. 23, it may also be attached to the rear panel 16'. Although the front-end portion of the flap 14' is laminated on the left portion 12L' shown in FIG. 16(c), it may also be placed between the left portion 12L' and the central portion of the rear panel 16' shown in FIG. 24.

The embodiment is suitable when the cover cloth 30' is provided and the pleat 12T' is formed by folding the upper portion of the airbag inwardly, as shown in FIGS. 20(a) to 22(b). In this case, first, the upper portion of the airbag is folded inwardly and the flap 14' is bent over to the side opposite to the side at which it is attached. Then, the flap 14' is folded and is covered with the cover cloth 30', and the side portions of the airbag are folded. Finally, the overall body of the airbag is folded.

Figure 25:
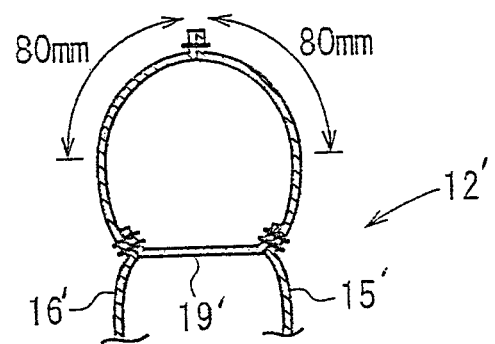
FIG. 25 is a sectional view for explaining a dimension of the airbag.

The embodiments simply show the examples of the present invention, and the present invention is not limited to the embodiments. As shown in FIG. 25, it is preferable to set a length of about 80 mm between the top end of the airbag 12' to a position of the front and rear panels at which a thickness of a top room becomes maximum. The present invention is not limited to this structure.

The disclosures of Japanese Patent Applications No. 2004-007013 filed on Jan. 14, 2004, No. 2004-007014 filed on Jan. 14, 2004, No. 2004-040110 filed on Feb. 17, 2004, and No. 2004-060880 filed on Mar. 4, 2004 are incorporated in the application.

While the invention has been explained with reference to the specific embodiments of the invention, the explanation is illustrative and the invention is limited only by the appended claims.

What is claimed is:

1. A leg-protection device disposed under a steering column for protecting an occupant, comprising:
    an airbag to be inflated upwardly along a bottom surface of a steering-column cover, said airbag having a front side portion facing the occupant, a rear side portion facing the bottom surface of the steering-column cover and an upper side portion facing the steering column, and
    a projecting member provided on the upper side portion of the airbag, said projecting member having a base end shorter in a lateral length than the upper side portion of the airbag, and projecting further upwardly from the upper side portion of the airbag when the airbag is inflated.

2. A leg-protection device according to claim 1, wherein said projecting member has a rectangular shape integrated with the airbag.

3. A leg-protection device according to claim 2, wherein said projecting member is folded on a side of the airbag facing the occupant or on an opposite side of the airbag.

4. A leg-protection device according to claim 2, wherein said projecting member is folded in a shape of bellows, a roll shape, or a combination of the shape of bellows and the roll shape.

5. A leg-protection device according to claim 2, further comprising a cover cloth attached to the airbag for covering the projecting member in a folded state.

6. A leg-protection device according to claim 2, wherein said upper side portion is folded inwardly and tucked in, said projecting member being folded together with the upper side portion.

7. A leg-protection device according to claim 1, wherein said projecting member is made as a member separately from the airbag, and is fixed to the airbag.

8. A leg-protection device according to claim 7, wherein said projecting member has a rectangular shape, said base end attached to the airbag on a side facing the occupant, and a front end disposed on a side opposite to the occupant such that the projecting member extends over the upper side portion of the airbag.

9. A leg-protection device according to claim 8, further comprising a cover cloth provided on the airbag on the side opposite to the occupant for covering the projecting member in a folded state.

10. A leg-protection device according to claim 7, wherein said projecting member has a rectangular shape, said base end attached to the airbag on a side opposite to the occupant and a front end disposed on a side facing the occupant such that the projecting member extends over the upper side portion of the airbag.

11. A leg-protection device according to claim 10, further comprising a cover cloth provided on the airbag on the side facing the occupant for covering the projecting member in a folded state.

12. A leg-protection device according to claim 8, wherein said upper side portion is folded inwardly and tucked in, said projecting member extending over the upper side portion and being folded in a shape of bellows, a roll shape, or a combination of the shape of bellows and the roll shape.

13. A leg-protection device according to claim 10, wherein said upper side portion is folded inwardly and tucked in, said projecting member extending over the upper side portion and being folded in a shape of bellows, a roll shape, or a combination of the shape of bellows and the roll shape.

14. A leg-protection device according to claim 1, wherein said projecting member is arranged to project upwardly along the bottom surface of the steering-column cover when the airbag is inflated.

15. A leg-protection device according to claim 1, wherein said projecting member is made as a part of the airbag and projects from an upper end of the airbag.

\* \* \* \* \*